(12) United States Patent
Singh et al.

(10) Patent No.: US 11,624,426 B2
(45) Date of Patent: *Apr. 11, 2023

(54) ORBITAL TENSIONER

(71) Applicant: GATES CORPORATION, Denver, CO (US)

(72) Inventors: Sukhdeep Singh, Lasalle (CA); Sangkyu Kim, Milton (CA); Anil Bhalla, London (CA); Michael Koppeser, Windsor (CA)

(73) Assignee: Gates Corporation, Denver, CO (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/018,061

(22) Filed: Sep. 11, 2020

(65) Prior Publication Data

US 2020/0408283 A1 Dec. 31, 2020

Related U.S. Application Data

(63) Continuation of application No. 15/920,013, filed on Mar. 13, 2018, now Pat. No. 10,876,606.

(51) Int. Cl.
*F16H 7/12* (2006.01)
*F16H 7/08* (2006.01)

(52) U.S. Cl.
CPC .......... *F16H 7/1218* (2013.01); *F16H 7/0831* (2013.01); *F16H 2007/081* (2013.01); *F16H 2007/0865* (2013.01); *F16H 2007/0874* (2013.01); *F16H 2007/0893* (2013.01)

(58) Field of Classification Search
CPC ............ F16H 2007/081; F16H 7/1218; F16H 2007/0893; F16H 2007/0874; F16H 2007/0865; F16H 7/0831; F02B 67/06

USPC .................................................. 474/133, 135
See application file for complete search history.

(56) References Cited

U.S. PATENT DOCUMENTS

| | | | | |
|---|---|---|---|---|
| 4,319,303 A | * | 3/1982 | Thorn | H05F 3/00 361/216 |
| 4,551,120 A | * | 11/1985 | Thomey | F16H 7/1281 474/135 |
| 5,076,920 A | * | 12/1991 | Danowski | B01D 27/08 210/243 |
| 5,803,849 A | * | 9/1998 | Ayukawa | F16H 7/1218 474/135 |
| 6,102,820 A | * | 8/2000 | Imaharu | F16H 7/1218 474/135 |
| 6,685,854 B2 | * | 2/2004 | Memmer | B01D 35/30 210/243 |
| 7,371,199 B2 | * | 5/2008 | Joslyn | F16H 7/1218 474/135 |
| 7,901,310 B2 | * | 3/2011 | Lolli | F02B 67/06 474/134 |

(Continued)

*Primary Examiner* — Henry Y Liu
(74) *Attorney, Agent, or Firm* — Kevin J. Aiken, Esq.

(57) ABSTRACT

A tensioner comprising a base, a ring engaged with the base, the ring rotatable about a center "C" within a base opening, a pulley journalled to the ring, a pivot arm pivotally engaged with the ring, a pulley journalled to the pivot arm, a torsion spring disposed between the ring and the pivot arm for urging the pivot arm, a damping assembly frictionally disposed between the base and the ring, a spring applying a normal load to the damping material, and the damping material having a resistance in the range of greater than 0Ω up to approximately 10,000Ω.

13 Claims, 4 Drawing Sheets

FIG.3

(56) References Cited

U.S. PATENT DOCUMENTS

| | | | | |
|---|---|---|---|---|
| 7,946,938 B2* | 5/2011 | Hallen | | F16H 7/1218 |
| | | | | 474/135 |
| 8,926,462 B2* | 1/2015 | Ward | | F16H 7/12 |
| | | | | 474/135 |
| 9,097,314 B2* | 8/2015 | Wolf | | F16H 7/1281 |
| 9,709,137 B2* | 7/2017 | Walter | | B60K 25/00 |
| 9,976,634 B2* | 5/2018 | Leucht | | F16H 7/0838 |
| 10,203,025 B2* | 2/2019 | Lindstrom | | F16H 7/1218 |
| 10,520,066 B2* | 12/2019 | Walter | | F02B 67/06 |
| 2002/0039944 A1* | 4/2002 | Ali | | F16H 7/1209 |
| | | | | 474/135 |
| 2004/0014542 A1* | 1/2004 | Quintus | | F16H 7/1218 |
| | | | | 474/135 |
| 2005/0004258 A1* | 1/2005 | Yamamoto | | F16D 69/026 |
| | | | | 523/149 |
| 2006/0111249 A1* | 5/2006 | Shinohara | | C08K 9/04 |
| | | | | 508/108 |
| 2009/0131208 A1* | 5/2009 | Hawryluck | | F16H 7/1281 |
| | | | | 474/135 |
| 2009/0239693 A1* | 9/2009 | Ruffini | | F16H 7/1281 |
| | | | | 474/112 |
| 2012/0316019 A1* | 12/2012 | Ward | | F16H 7/1218 |
| | | | | 474/135 |
| 2013/0260932 A1* | 10/2013 | Adam | | F16H 7/1218 |
| | | | | 474/134 |
| 2014/0113755 A1* | 4/2014 | Ward | | F16H 7/1281 |
| | | | | 474/112 |
| 2014/0242405 A1* | 8/2014 | Palumbo | | F16D 69/027 |
| | | | | 428/656 |
| 2015/0308545 A1* | 10/2015 | Harvey | | F16H 7/1218 |
| | | | | 474/117 |
| 2015/0345597 A1* | 12/2015 | Walter | | F16H 7/1218 |
| | | | | 474/134 |
| 2015/0354675 A1* | 12/2015 | Hao | | F16H 7/1281 |
| | | | | 474/90 |
| 2017/0146100 A1* | 5/2017 | Walter | | F02B 67/06 |
| 2017/0225373 A1* | 8/2017 | Mitsutsuji | | C08K 7/06 |
| 2018/0010670 A1* | 1/2018 | Leucht | | F16H 7/0831 |
| 2018/0298995 A1* | 10/2018 | Reuschel | | F16H 7/0838 |
| 2018/0320765 A1* | 11/2018 | Hauck | | F16H 7/1281 |

* cited by examiner

ORBITAL TENSIONER

FIELD OF THE INVENTION

The invention relates to a tensioner, and more particularly, to a tensioner having a damping material having a resistance in the range of 0Ω up to approximately 10,000Ω.

BACKGROUND OF THE INVENTION

Belt tensioners are used to impart a load on a belt. Typically the belt is used in an engine application for driving various accessories associated with the engine. For example, an air conditioning compressor and alternator are two of the accessories that may be driven by a belt drive system. A belt tensioner may include a pulley journalled to an arm which is pivotable on a base. A spring is connected between the arm and a base. The spring may also engage a damping assembly. The damping assembly may include frictional surfaces in contact with each other. The damping assembly damps an oscillatory movement of the arm caused by operation of the belt drive. This in turn enhances a belt life expectancy and the tensioner life expectancy, by minimizing wear on movable components.

Orbital tensioners have been applied to single belt drives which have load reversals, such as starter-generator applications, in order to tension either or both of two spans of the same belt. Since such tensioners work in concert on a single belt, they typically have a single torsion spring. Market demands can include reduction of emissions and increases in fuel economy by lowering the weight of the automobile and reducing the number of under-the-hood components.

An approach taken toward these goals involves combining the function of the starter motor and the function of the alternator into a single device, a motor generator unit or MGU. Also toward the goal of increasing fuel economy, the MGU promotes the use of a feature called "stop-in-idle". This feature is where the engine is allowed to die when it would ordinarily idle, then be restarted when the automobile is expected to resume motion. This feature substantially increases the demands placed upon accessory belt drives. In this type of application the starter/generator is placed in mechanical communication with the crankshaft via the accessory belt drive.

Representative of the art is EP patent no. 2128489B1 which discloses a belt tensioning device for a belt drive which comprises a driving machine with a driving belt pulley drivable by a driveshaft around a driving axis, and a plurality of further belt pulleys, and with an infinite belt which is wrapped around the driving belt pulley and the further belt pulleys, wherein the belt tensioning device comprises a housing in which two tensioning arms are supported so as to be pivotable around a common pivot axis, in which tensioning arms there are supported tensioning rollers with axes of rotation extending parallel to the driving axis, wherein the tensioning arms are supported relative to one another by spring means, wherein the housing can be mounted, in presence of the driving belt pulley being mounted at the driving machine, in that the housing is contact-free relative to the driving machine in an annular region surrounding the driveshaft of the driving belt pulley, characterized in that the pivot axis of the tensioning arms is arranged inside the diameter of the driving belt pulley.

An MGU generates an electric field in operation. The electric field can cause a charge to be developed on a tensioner pivot arm, leading to sparking between the pivot arm and ground. The pivot arm is typically electrically isolated from ground by virtue of the damping material used. Most damping materials are a form of plastic which is electrically isolating and non-conductive. This can lead to creation of an electrical potential between the pivot arm and ground.

What is needed is a tensioner having a damping material having a resistance in the range of 0Ω up to approximately 10,000Ω. The present invention meets this need.

SUMMARY OF THE INVENTION

The primary aspect of the invention is to provide a tensioner having a damping material having a resistance in the range of 0Ω up to approximately 10,000Ω.

Other aspects of the invention will be pointed out or made obvious by the following description of the invention and the accompanying drawings.

The invention comprises a tensioner comprising a base, a ring engaged with the base, the ring rotatable about a center "C" within a base opening, a pulley journalled to the ring, a pivot arm pivotally engaged with the ring, a pulley journalled to the pivot arm, a torsion spring disposed between the ring and the pivot arm for urging the pivot arm, a damping material frictionally disposed between the base and the ring, a spring applying a normal load to the damping material, and the damping material having a resistance in the range of greater than 0Ω up to approximately 10,000Ω.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
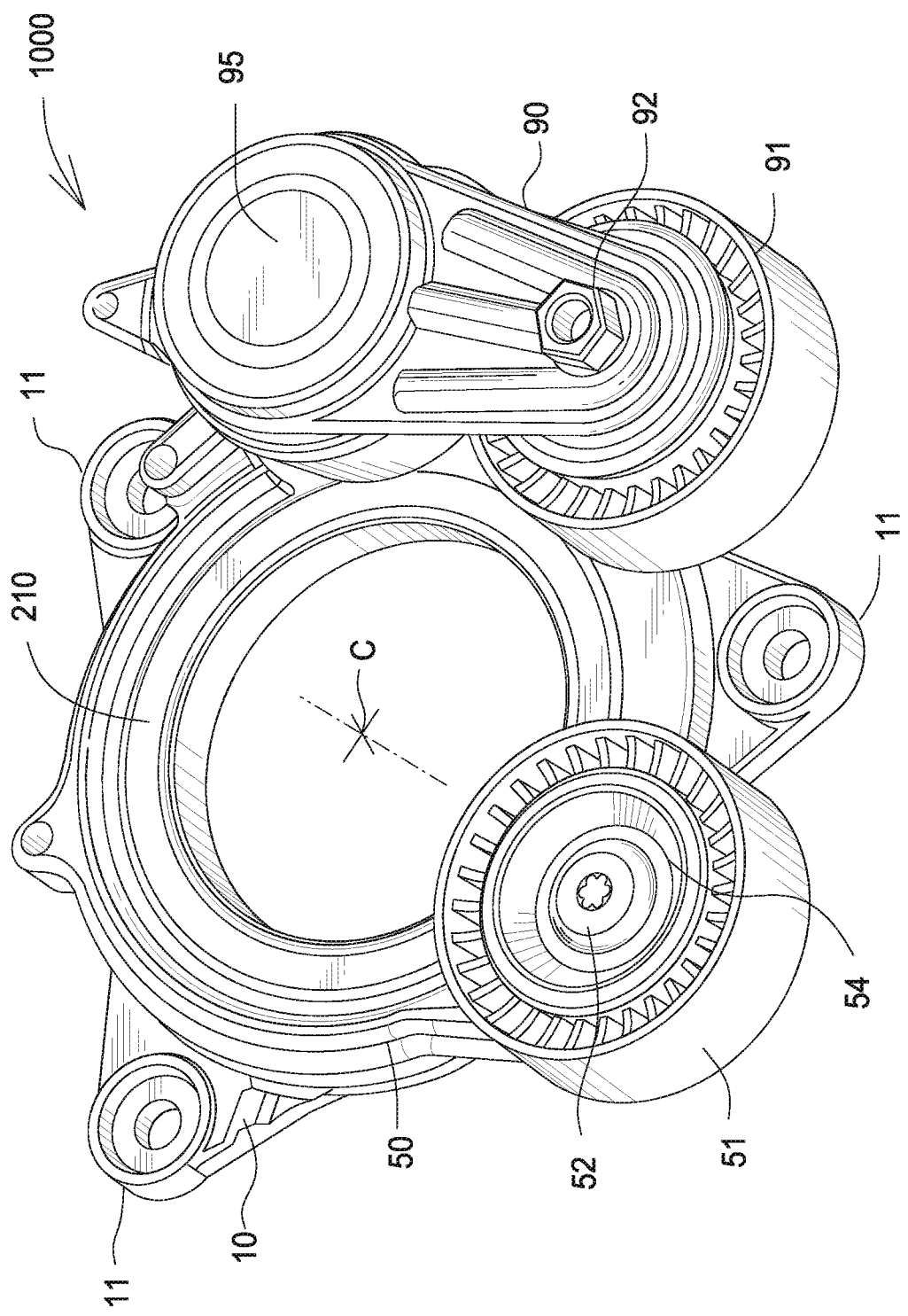
FIG. 1 is a perspective view of the tensioner.

FIG. 1 is a perspective view of the tensioner. Tensioner 1000 comprises base 10. Ring 50 rotates about a center "C" on base 10. Center "C" is within a base opening 12. Opening 12 can receive a pulley attached to an MGU (not shown). Center "C" does not project on the body of the tensioner.

Pivot arm 90 is pivotally attached to ring 50. Pulley 51 is journalled to ring 50 through a fastener 52. Pulley is journalled to pivot arm 90 through a fastener 92. Base 10 comprises one or more mounting bosses 11 for attaching the tensioner to a mounting surface, such as an engine motor generator unit (MGU). A belt (not shown) is typically routed from pulley 51, around an MGU pulley (not shown) to pulley 91. The axis of rotation of the MGU pulley aligns with center "C". The pivot axis A-A of pivot arm 90 is not aligned with center "C", it is offset from center "C". Pivot arm 90, base 10 and ring 50 comprise a metallic material known in the art, for example steel, aluminum or any suitable alloys. Tensioner 1000 is also referred to as an orbital tensioner.

Figure 2:
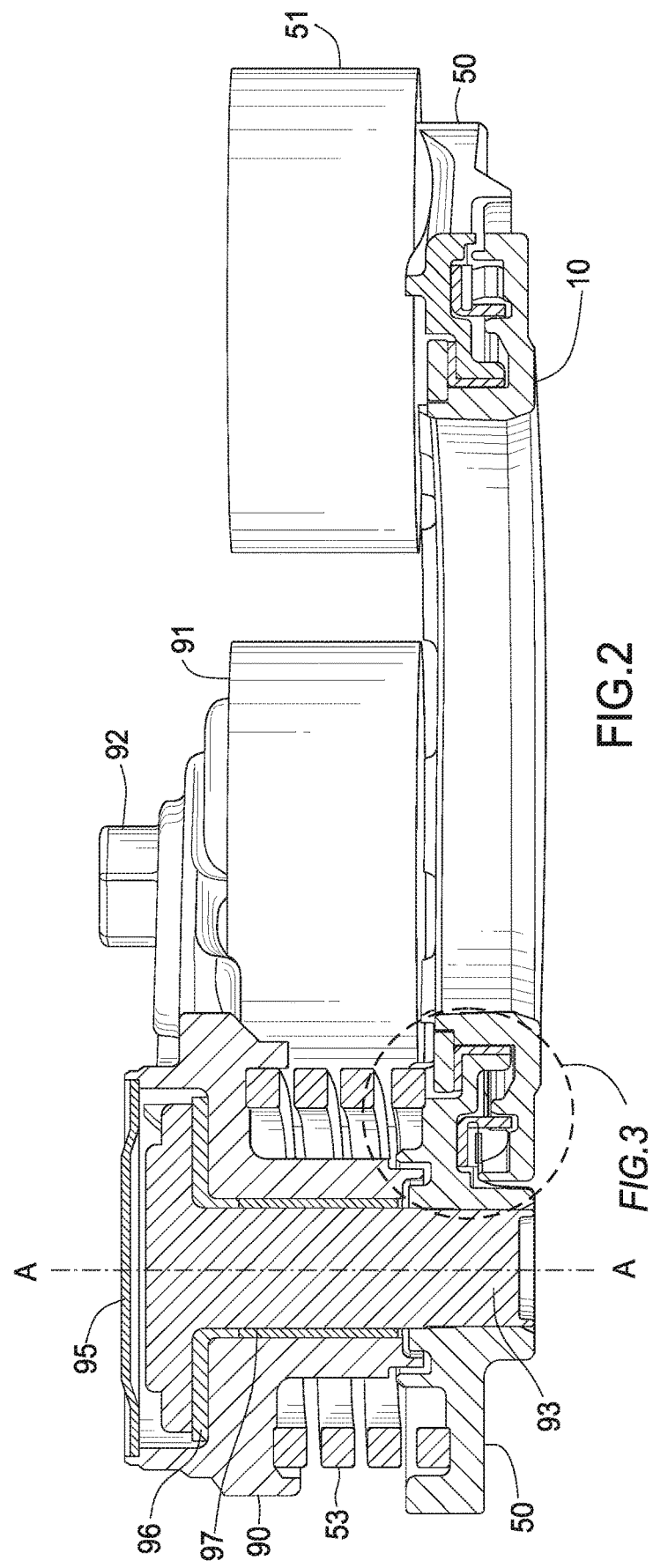
FIG. 2 is a cross sectional view of the tensioner.

FIG. 2 is a cross sectional view of the tensioner. Torsion spring 53 is engaged between pivot arm 90 and ring 50. Torsion spring 53 urges pivot arm 90 into contact with a belt (not shown). Pivot arm 90 pivots about shaft 93 on bushing 97 and bushing 96. Dust cover 95 prevents debris from contaminating bushing 96.

Figure 3:
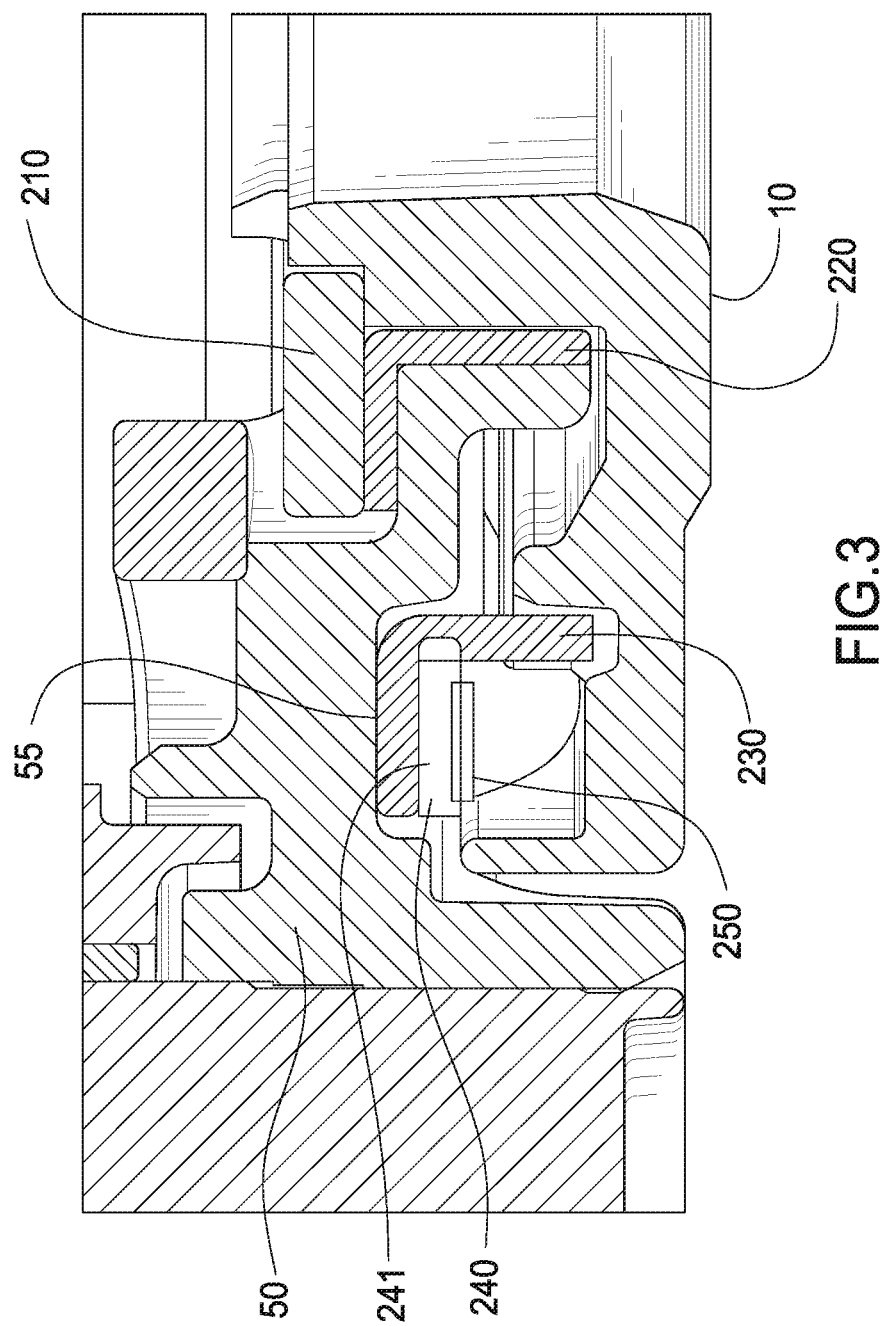
FIG. 3 is a detail of FIG. 2.

FIG. 3 is a detail of FIG. 2. Retaining member 210 retains ring 50 to base 10. Retaining member 210 is press fit to base 10. Bushing 220 facilitates rotational movement of ring 50. Wave spring 250 applies an evenly distributed normal load to damping assembly 240, thereby pressing it into frictional contact with surface 55 of ring 50. Damping assembly 240 comprises damping material 230 and a metallic backing plate 241. For the inventive tensioner damping material 230 is conductive.

In operation, a voltage potential (static charge) can occur between base 10 and ring 50, due to the electric field of the MGU. As a result of charge buildup, discharge or sparking can occur between the base 10 and the ring 50. Sparking can be detrimental to vehicle operation, longevity of the tensioner, and can be disconcerting to a vehicle operator.

To eliminate sparking, conductive damping material 230 comprises conductive ingredients to ground ring 50 to the engine through the MGU. For example, electrical resistance across damping material 230 drops from approximately 800 GΩ to less than approximately 5KΩ when the conductive damping material is used. The significantly reduced electrical resistance provides a conductive path which eliminates sparking between the pivot arm and the base. The electrical resistance range across damping material 230 is greater than 0Ω up to approximately 10,000Ω. Preferably the resistance is less than approximately 5000Ω.

The electrical resistance is measured between a point on base 20 and a point on ring 50. The points are roughly adjacent to each other across the damping assembly 240, so, the resistance is measured across the damping assembly and the damping material.

While it is known to use carbon fiber as a conductive material, carbon fiber is about 10× more costly than glass fiber or aramid fiber and so carbon fiber is not cost effective. On the other hand, the inventive wear resistant conductive damping material comprises a minimal amount of stainless steel fibers (approximately 3% to approximately 5%) which makes the damping material sufficiently conductive when combined with a low cost glass fiber or aramid fiber.

By weight, the damping material comprises the following approximate amounts: Aramid fiber ~10%; PTFE plus molybdenum disulphide ~17%; Stainless steel fibers ~3% to ~5%; a balance of Nylon 66 (~70% to ~68%) depending on the amount of stainless steel fibers. Some variation of up to approximately ±2% of the amount of each ingredient other than the stainless steel fiber is possible with equal success. Glass fiber may be used in place of aramid fiber with equal success.

The aspect ratio of the stainless steel fibers must be large enough to easily conduct electricity at low loadings by weight, but small enough to be easily molded with the matrix polymer material into the final part. Accordingly, stainless steel fibers having a diameter of about 8 microns and a nominal length in the range of approximately 3 mm to approximately 13 mm are selected. Longer steel fibers can also be used depending on the design of the damping assembly. The diameter may be in the range of approximately 6 microns to approximately 10 microns with equal success.

Bushing 96, bushing 97 and bushing 220 may each or all comprise the conductive damping material as well. This further reduces any tendency to spark by providing other conductive paths for electrical charge to dissipate to ground.

The conductive damping material can be used in any style of tensioner for the purpose of discharging a static charge.

Figure 4:
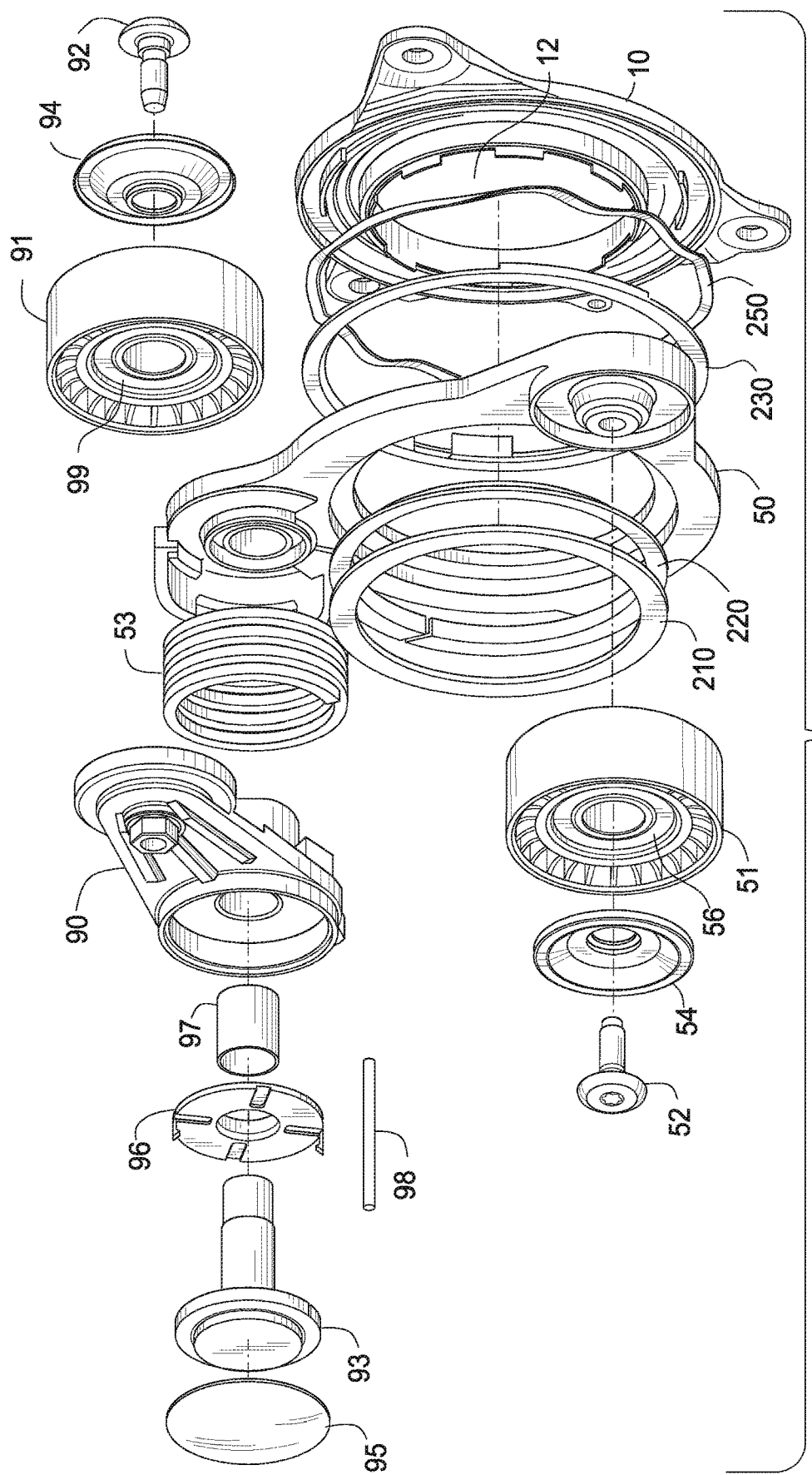
FIG. 4 is an exploded view of the tensioner.

FIG. 4 is an exploded view of the tensioner. Wave spring 250 is captured between ring 50 and base 10. Wave spring 250 presses damping assembly 240 into contact with ring 50, generating a normal force. The normal force so applied to the damping assembly results in a frictional force which in turn damps a relative movement of ring 50 with respect to base 10.

Retaining member 210 clamps ring 50 to base 10. Retaining member 210 is fixed to base 10 and does not rotate with ring 50. Fastener 92 attaches pulley 91 to pivot arm 90. Fastener 52 attaches pulley 51 to ring 50. Dust shield 54 prevents debris from entering bearing 56. Dust shield 94 prevents debris from entering bearing 99.

Locking pin 98 removably engages between pivot arm 90 and ring 50. During installation, pin 98 locks pivot arm 90 in a pre-determined position with respect to ring 50. Once the tensioner is installed on an MGU and a belt routed, for example, pin 98 is removed which then frees pivot arm 90 to engage the belt (not shown). Engagement with a belt applies a belt load which then enables power transmission by the belt, for example, from an engine crankshaft to an MGU (not shown).

Although a form of the invention has been described herein, it will be obvious to those skilled in the art that variations may be made in the construction and relation of parts and method without departing from the spirit and scope of the invention described herein.

We claim:

1. A tensioner comprising:
   a base;
   a ring engaged with the base, the ring rotatable about a center "C" within a base opening, a pulley journalled to the ring;
   a pivot arm pivotally engaged with the ring, a pulley journalled to the pivot arm;
   a torsion spring disposed between the ring and the pivot arm for urging the pivot arm;
   a damping assembly frictionally disposed between the base and the ring, a spring applying a normal load to the damping assembly; and
   the damping assembly comprising a damping material having a resistance in the range of greater than 0Ω up to approximately 10,000Ω and a metallic backing plate for the damping material.

2. The tensioner of claim 1 wherein the pivot arm has a pivot axis that is offset from center "C".

3. The tensioner of claim 2 further comprising a bushing disposed between the ring and the base to facilitate rotational movement of the ring.

4. The tensioner of claim 1 wherein the damping material comprises at least one conductive ingredient.

5. The tensioner of claim 4 wherein the at least one conductive ingredient is carbon fiber.

6. The tensioner of claim 4 wherein the at least one conductive ingredient is stainless steel fiber.

7. The tensioner as in claim 4, wherein the damping material further comprises Nylon 66.

8. The tensioner as in claim 1, wherein the spring comprises a wave spring.

9. The tensioner as in claim 1, wherein a retaining member attached to the base retains the ring to the base.

10. The tensioner as in claim 1, further comprising a bushing between the ring and the base, the bushing having a resistance in the range of greater than 0Ω up to approximately 10,000Ω.

11. The tensioner as in claim 10 wherein the bushing comprises stainless steel fibers.

12. The tensioner as in claim 1, wherein the resistance of the damping material is less than approximately 5000Ω.

13. The tensioner as in claim 6, wherein the resistance of the bushing is less than approximately 5000Ω.

* * * * *